United States Patent [19]

Mennemann et al.

[11] 4,438,211

[45] Mar. 20, 1984

[54] OPTICAL AND OPHTHALMIC GLASS WITH REFRACTIVE INDICES ND>1.58, ABBE NUMBERS>45 AND DENSITIES<2.75 G/CM³

[75] Inventors: Karl Mennemann, Taunusstein; Georg Gliemeroth; Volkmar Geiler, both of Mz. Finthen, all of Fed. Rep. of Germany

[73] Assignee: Schott Glaswerke, Mainz, Fed. Rep. of Germany

[21] Appl. No.: 431,401

[22] Filed: Sep. 30, 1982

[30] Foreign Application Priority Data

Oct. 2, 1981 [DE] Fed. Rep. of Germany ....... 3139212

[51] Int. Cl.³ .............................................. C03C 3/08
[52] U.S. Cl. ........................................ 501/65; 501/58; 501/59; 501/61; 501/62; 501/63; 501/64; 501/66; 501/67; 501/903
[58] Field of Search .................... 501/903, 65, 67, 66, 501/58, 59, 61, 62, 63, 64

[56] References Cited

U.S. PATENT DOCUMENTS

Re. 23,049 11/1948 Armistead ............................. 501/67
3,898,093 8/1975 Faulstich et al. ................... 501/903
4,084,978 4/1978 Sagara ................................. 501/903

*Primary Examiner*—Helen M. McCarthy
*Attorney, Agent, or Firm*—Haight & Associates

[57] ABSTRACT

A borosilicate glass composition suitable for use as an eyeglass lens, characterized by having a refractive index $nd \geq 1.58$, an Abbe number $vd \geq 45$, a density $\rho \leq 2.75$ g/cm³, and an excellent aptitude for chemical hardening, consisting essentially of the following composition, in weight percent:

| | |
|---|---|
| $SiO_2$ | 51–65 |
| $B_2O_3$ | 2–14 |
| $Al_2O_3$ | 0–5 |
| $SiO_2 + B_2O_3 + Al_2O_3$ | 62–73 |
| $Li_2O$ | 4–13 |
| $Na_2O$ | 0–4 |
| $K_2O$ | 0–4 |
| $Li_2O + Na_2O + K_2O$ | 7–15 |
| CaO | 1–19 |
| MgO | 0–11 |
| CaO + MgO | 6–22 |
| $TiO_2$ | 0–8 |
| $ZrO_2$ | 0–9. |

15 Claims, No Drawings

OPTICAL AND OPHTHALMIC GLASS WITH REFRACTIVE INDICES ND>1.58, ABBE NUMBERS>45 AND DENSITIES<2.75 G/CM$^3$

DESCRIPTION OF THE INVENTION

1. Technical Field of the Invention

This invention relates to heretofore unknown optical and ophthalmic glass compositions having refractive indices nd≧1.58, generally about 1.58 to 1.60; Abbe numbers vd≧45, preferably >50 and generally about 51-58; mass densities ρ≦2.75 g/cm$^3$, generally about 2.5-2.75 g/cm$^3$; and which, due to a Li$_2$O content of ≧4 weight percent, generally 8-13 percent, show an excellent aptitude for chemical hardening.

2. Background Art

Glasses of having a composition similar to those of the present invention have heretofore been described only as optical glasses and have a substantially higher density. For example, Japanese Published Patent Application No. 79-10882 and British Published Patent Application No. 20 29 401 describe optical glasses with refractive indices of 1.55 to 1.60 and Abbe numbers >48 but with a density <2.9 g/cm$^3$.

While Japanese Published Patent Application No. 79-10882 describes a total alkali metal content (Li$_2$O--Na$_2$O+K$_2$O) of 5 to 15 percent, the Li$_2$O content amounts to maximally 1 percent. Relatively high Li$_2$O percentages would have to be ruled out because the ZnO content is relatively high; furthermore, the presence of both oxides in relatively high percentages would inevitably result in clouding and thus render the glass compositions unsuitable for use as an eyeglass lens.

According to British Published Patent Application No. 20 29 401, the maximum percentage of Li$_2$O according to the given examples amounts to 2 percent. Here, too, higher Li$_2$O percentages are ruled out because of the simultaneous presence of a relatively high ZnO content.

DISCLOSURE OF THE INVENTION

Accordingly, it is a general object of the present invention to provide an improved glass composition useful in the manufacture of eyeglass lenses.

Another object of the present invention is to provide such a composition which permits the manufacture of lightweight lenses.

A further object of the present invention is to provide such a composition having a unique composition of high refractive index, low density, high Abbe number, and good reciptivity to chemical hardening.

A more particular object of the present invention is to provide a borosilicate glass composition suitable for use as an eyeglass lens, characterized by having a refractive index nd≧1.58, an Abbe number vd≧45, a density ρ≦2.75 g/cm$^3$, and an excellent aptitude for chemical hardening.

Upon study of the specification and appended claims, further objects, features and advantages of the present invention will become more fully apparent to those skilled in the art to which this invention pertains.

BEST MODE FOR CARRYING OUT THE INVENTION

Briefly, the above and other objects, features and advantages of the present invention are attained in one aspect thereof by providing a glass composition having the above characteristics and comprising the following ingredients, in weight percent:

| | |
|---|---|
| SiO$_2$ | 51-65 |
| B$_2$O$_3$ | 2-14 |
| Al$_2$O$_3$ | 0-5 |
| SiO$_2$ + B$_2$O$_3$ + Al$_2$O$_3$ | 62-73 |
| Li$_2$O | 6-13 |
| Na$_2$O | 0-4 |
| K$_2$O | 0-4 |
| Li$_2$O + Na$_2$O + K$_2$O | 7-15 |
| CaO | 1-19 |
| MgO | 0-11 |
| CaO + MgO | 6-22 |
| TiO$_2$ | 0-8 |
| ZrO$_2$ | 0-9 |

TiO$_2$ + ZrO$_2$ being present in an amount sufficient to exhibit the requisite refractive index, Abbe number, and density ranges; and

| | |
|---|---|
| ZnO | up to 2.5. |

The most prominent difference between glasses according to this invention and these prior art teachings resides in the high Li$_2$O content of >4 percent. In the glasses according to the present invention, Li$_2$O has a significant influence on the following properties: (1) High refractive index; (2) Low density; (3) High Abbe number; and (4) Aptitude for chemical hardening. The high Li$_2$O content in the glasses according to the present invention is all the more surprising it would be clearly expected by those skilled in the art that such glass compositions would not be sufficiently stable to devitrification to make them suitable for a continuous production process.

By comparison with known high-refractive index optical glasses for eyeglass lenses with refractive indices nd=1.70 and a density of about 3.0 g/cm$^3$ (e.g., according to German Auslegeschrift No. 2 259 183) the glasses according to the present invention in the lower dioptric range ±5 D have the advantage of an excellent hardening aptitude, leading to a reduction in minimum thickness and a significant weight saving without entailing the disadvantage of high dispersion; it is well known that high dispersion has the effect of making the wearer of the eyeglasses see interfering color fringes.

The influence of the Li$_2$O content in regard to density is very remarkable, as will be noted from the following comparison of an example according to British Patent Published Application No. 20 29 401 with the present invention:

| UK 20 29 401 Example 8 | | Present Invention Example 3 | | Present Invention Example 4 |
|---|---|---|---|---|
| SiO$_2$ | 57 percent | SiO$_2$ | 54.0 percent | 56.3 percent |
| TiO$_2$ | 5 percent | B$_2$O$_3$ | 11.6 percent | 11.9 percent |
| CaO | 20 percent | Li$_2$O | 12.15 percent | 11.9 percent |
| ZnO | 12.7 percent | MgO | 2.5 percent | 3.9 percent |
| Na$_2$O | 2 percent | CaO | 13.2 percent | 4.4 percent |
| K$_2$O | 3 percent | TiO$_2$ | 2.25 percent | 4.6 percent |
| Al$_2$O$_3$ | 0.3 percent | ZrO$_2$ | 4.3 percent | 7.0 percent |
| nd | 1.60082 | | 1.6003 | 1.6020 |
| vd | 49.9 | | 55.60 | 51.80 |
| ρ | 2.87 | | 2.64 | 2.63 |

As revealed by this comparison, the glasses according to the cited state of the art have about a 10 percent higher density with a clearly lower Abbe number vd, which is of great significance for an optical quality glass for use in eyeglass lenses.

In the application of glasses according to the present invention to the manufacture of eyeglass lenses, this means that the outer marginal thickness (in the case of 'minus'-lenses) or the thickness of the middle region (in the case of 'plus'-lenses) is reduced at such densities, which improves the cosmetic appearance and results in an overall lighter weight of the finished spectacles. A further weight saving can be obtained by reduction of the minimum thickness of the lens, in as much as the desired mechanical strength can be obtained by pre-tensioning (chemical hardening). With the glasses according to this invention, chemical hardening is obtainable in a very short time with adequate pre-tension and layer thickness by virtue of an Li/Na exchange.

The reduction of minimum thickness and the thinner thickness dimensions at outer edges or in the central region at the same time represents considerable progress relative to plastic lenses because the latter still have the disadvantage of low scratch-resistance and, in case of fracture, the formation of dangerous, needle-sharp splinters.

The glasses according to this invention are formulated within the $SiO_2$—$B_2O_3$—$Li_2O$—$CaO$—glass system. They are borosilicate glasses which are distinguished by their good chemical stability. In order to achieve the aforementioned properties of an aptitude for good chemical hardenability and a high refractive index at very low density, a $Li_2O$-content of at least 4 percent is needed, generally 6–13 percent.

The total amount of alkali metals ($Li_2O + Na_2O + K_2O$) is from 7 to 15 percent; a minimum percentage of 7 percent is needed to ensure good fusability of the glass raw materials. Amounts in excess of 15 percent greatly reduce the viscosity of the melt, increase the crystallization tendency and decrease chemical resistance.

The total quantity of the vitrifiers $SiO_2 + B_2O_3 + Al_2O_3$ amounts to 62–73 percent. With a vitrifier content of more than 73 percent, the desired high refractive index $\geq 1.58$ combined with low density cannot be achieved. The minimum quantity of $SiO_2$ is 51 percent; with a lower percentage the glass deteriorates in chemical stability. In order to achieve the relatively high refractive index combined with low density, the presence of 6–22 percent of the light alkaline earth oxides $CaO + MgO$ is required. $TiO_2$ strongly increases the refractive index while it greatly lowers the Abbe number, so that percentages of $TiO_2$ greater than 8 percent are not possible if the Abbe number is to be >45. $ZrO_2$ also perceptibly raises the refractive index but lowers the Abbe number only to a moderate degree; however, it also increases the density. Also, with $ZrO_2$ contents much in excess of 8 percent, devitrification stability is lowered so far as to rule out continuous production.

Glasses meeting one or more of the criteria defined by the subclaims are the most preferred glasses inasmuch as they are formulated within the optimum composition range for maximum devitrification stability, lowest possible density for the given refractive indices and Abbe numbers, optimum chemical hardening behavior, and maximum chemical stability. These glass compositions have refractive indices nd$\geq 1.58$, generally about 1.58 to 1.60; Abbe numbers vd$\geq 45$, preferably >50 and generally about 51–58; mass densities $\rho \leq 2.75$ g/cm$^3$, generally about 2.5–2.75 g/cm$^3$; and a $Li_2O$ content of $\geq 4$ weight percent, generally 8–13 percent.

Other components customarily added to eyeglass lenses can be employed in the usual manner for their customary purposes. For example, such glasses can contain 0.5–2.5 weight percent ZnO; 0.5–9 weight percent SrO; at least 0.5 weight percent BaO; 0.5–6 weight percent PbO; at least 0.5 weight percent MgO; and combinations of the foregoing, preferably wherein SrO + BaO + ZnO + PbO = 10 weight percent. Furthermore, the glasses can contain 0.5–8 weight percent $La_2O_3$, which can be substituted wholly or partially on a molar basis by at least one other optically suitable rare earth oxide. Also, the glasses can contain 0.5–7 weight percent $Nb_2O_5$; 0.5–5 weight percent $WO_3$; 0.5–3 weight percent $Ta_2O_5$; or 0.5–5 weight percent $P_2O_5$. In any of these compositions, 0.5–3 weight percent of the oxygen ions can be substituted by fluoride ions.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLES 1–12

The glasses according to this invention are generally produced as follows: the components—oxides, carbonates, nitrates—are weighed out in accordance with the prescription and a refining agent (e.g., $As_2O_3$ or $Sb_2O_3$) is added at the rate of 0.1–1 percent and the whole composition is well mixed. It is then melted down in a ceramic basin or platinum crucible at 1300°–1400° C., refined, well homogenized by means of an agitator, and press-moulded at 900°–970° C. into lens blanks for spectacles.

Examples 1–12 were prepared using such a process, with the sample melt for 200 kg calculated glass in Example 6 shown below:

|  | weight percent | raw material | weighed quantity, kg |
|---|---|---|---|
| $SiO_2$ | 56.1 | Sipur | 112.42 |
| $B_2O_3$ | 6.8 | $H_3BO_3$ | 24.11 |
| $Li_2O$ | 8.0 | $Li_2CO_3$ | 40.00 |
| $Na_2O$ | 1.7 | $Na_2CO_3$ | 5.84 |
| MgO | 4.7 | $MgCO_3$ | 23.85 |
| CaO | 10.7 | $CaCO_3$ | 38.21 |
| ZnO | 2.4 | ZnO | 4.83 |
| $ZrO_2$ | 6.4 | $ZrO_2$ | 12.84 |
| $La_2O_3$ | 1.6 | $La_2O_3$ | 3.21 |
| $Nb_2O_5$ | 1.6 | $Nb_2O_5$ | 3.20 |
|  |  |  | 268.52 |
|  | $As_2O_3$ (refining agent) |  | 0.30 |
|  |  |  | 268.82 |
| nd | 1.5955 |  |  |
| vd | 55.80 |  |  |
| $\rho$ | 2.74 |  |  |
| $\alpha$20–300 | 88 |  |  |
| SR | <2 |  |  |

Chemical hardening in a $NaNO_3$ fused salt bath was effected under the following conditions:

| time | 2 hours |
|---|---|
| temperature | 410° C. |
| exchanger layer | 65μ |
| pre-tension | 2,300 nm/cm. |

The following Table illustrates 12 examples of melts prepared in accordance with the present invention following similar processes:

| Melt Example: | 1 | 2 | 3 | 4 | 5 | 6 |
|---|---|---|---|---|---|---|
| SiO$_2$ | 61.6 | 63.5 | 54.0 | 56.3 | 61.8 | 56.1 |
| B$_2$O$_3$ | 7.2 | 7.3 | 11.6 | 11.9 | 8.8 | 6.8 |
| Li$_2$O | 11.7 | 11.2 | 12.15 | 11.9 | 12.3 | 8.0 |
| MgO | 2.3 | 1.2 | 2.50 | 3.9 | 1.3 | 4.7 |
| CaO | 12.7 | 8.8 | 13.20 | 4.4 | 5.3 | 10.7 |
| TiO$_2$ | 3.3 | 2.15 | 2.25 | 4.6 | 2.3 | — |
| ZrO$_2$ | 1.2 | 5.85 | 4.30 | 7.0 | 8.2 | 6.4 |
| Na$_2$O | — | — | — | — | — | 1.7 |
| ZnO | — | — | — | — | — | 2.4 |
| La$_2$O$_3$ | — | — | — | — | — | 1.6 |
| Nb$_2$O$_5$ | — | — | — | — | — | 1.6 |
| nd | 1.5910 | 1.5865 | 1.6003 | 1.6020 | 1.5875 | 1.5955 |
| vd | 55.90 | 55.20 | 55.60 | 51.80 | 54.70 | 55.80 |
| ρ | 2.59 | 2.60 | 2.64 | 2.63 | 2.60 | 2.74 |

| Melt Example: | 7 | 8 | 9 | 10 | 11 | 12 |
|---|---|---|---|---|---|---|
| SiO$_2$ | 56.0 | 61.8 | 59.2 | 63.7 | 60.4 | 58.9 |
| B$_2$O$_3$ | 6.85 | 7.2 | 6.0 | 5.0 | 7.1 | 9.7 |
| Li$_2$O | 8.10 | 11.7 | 11.0 | 11.0 | 10.0 | 12.9 |
| MgO | 6.10 | 2.0 | — | — | — | 6.5 |
| CaO | 15.00 | 12.0 | 8.0 | 10.0 | 8.1 | 7.2 |
| TiO$_2$ | 3.60 | — | 3.1 | 3.3 | 2.9 | 4.1 |
| ZrO$_2$ | — | 1.0 | 1.2 | 1.0 | 1.0 | — |
| Na$_2$O | 1.9 | — | — | — | — | — |
| ZnO | 2.45 | — | — | — | — | — |
| K$_2$O | — | — | — | — | 3.0 | — |
| BaO | — | — | 7.0 | — | — | — |
| SrO | — | — | — | — | 4.0 | — |
| Nb$_2$O$_5$ | — | 4.3 | — | — | — | 0.7 |
| La$_2$O$_3$ | — | — | — | 6.0 | — | — |
| PbO | — | — | — | — | 3.5 | — |
| Al$_2$O$_3$ | — | — | 4.5 | — | — | — |
| nd | 1.5990 | 1.5860 | 1.5840 | 1.5920 | 1.5880 | 1.5920 |
| vd | 53.40 | 57.20 | 56.40 | 55.00 | 53.80 | 53.92 |
| ρ | 2.59 | 2.62 | 2.69 | 2.67 | 2.68 | 2.58 |

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

INDUSTRIAL APPLICABILITY

As can be seen from the present specification and examples, the present invention is industrially useful in providing an optical quality glass useful in making light-weight eyeglass lenses.

What is claimed is:

1. A borosilicate glass composition suitable for use as an eyeglass lens, characterized by having a refractive index nd of about 1.58–1.60, an Abbe number vd > 50, a density $\rho \leq 2.75$ g/cm$^3$, and an excellent aptitude for chemical hardening, consisting essentially of the following composition, in weight percent:

| | |
|---|---|
| SiO$_2$ | 51–65 |
| B$_2$O$_3$ | 2–14 |
| Al$_2$O$_3$ | 0–5 |
| SiO$_2$ + B$_2$O$_3$ + Al$_2$O$_3$ | 62–73 |
| Li$_2$O | 6–13 |
| Na$_2$O | 0–4 |
| K$_2$O | 0–4 |
| Li$_2$O + Na$_2$O + K$_2$O | 7–15 |
| CaO | 1–19 |
| MgO | 0–11 |
| CaO + MgO | 6–22 |
| TiO$_2$ | 0–8 |
| ZrO$_2$ | 0–9. |

TiO$_2$ + ZrO$_2$ being present in an amount sufficient to exhibit said refractive index, Abbe number, and density ranges; and

| ZnO | up to 2.5 |
|---|---|

2. Glass according to claim 1, having a density of 2.50–2.75 g/cm$^3$ and being further characterized by the following composition, in weight percent:

| | |
|---|---|
| SiO$_2$ | 58–64 |
| B$_2$O$_3$ | 4–9 |
| Al$_2$O$_3$ | 0–3 |
| SiO$_2$ + B$_2$O$_3$ + Al$_2$O$_3$ | 66–73 |
| Li$_2$O | 8–13 |
| Na$_2$O | 0–2 |
| K$_2$O | 0–2 |
| Li$_2$O + Na$_2$O + K$_2$O | 10–13.5 |
| MgO | 0–6 |
| CaO | 7–14 |
| MgO + CaO | 9–17 |
| TiO$_2$ | 1.5–7 |
| ZrO$_2$ | 1–6 |
| TiO$_2$ + ZrO$_2$ | 4–8. |

3. Glass according to claim 1 or 2, containing 8–13 weight percent Li$_2$O and 0.5–2.5 weight percent ZnO.

4. Glass according to claim 1 or 2, further comprising 0.5–9 weight percent SrO.

5. Glass according to claim 1 or 2, further comprising at least 0.5 weight percent BaO.

6. Glass according to claim 1 or 2, further comprising 0.5–6 weight percent PbO.

7. Glass according to claim 1 or 2, further comprising at least 0.5 weight percent MgO.

8. Glass according to claim 1 or 2, wherein SrO + BaO + ZnO + PbO = 10 weight percent.

9. Glass according to claim 1 or 2, further comprising 0.5–8 weight percent La$_2$O$_3$.

10. Glass according to claim 9, wherein La$_2$O$_3$ is substituted wholly or partially on a molar basis by at least one other optically suitable rare earth oxide.

11. Glass according to claim 1 or 2, further comprising 0.5–7 weight percent Nb$_2$O$_5$.

12. Glass according to claim 1 or 2, further comprising 0.5–5 weight percent WO$_3$.

13. Glass according to claim 1 or 2, further comprising 0.5–3 weight percent Ta$_2$O$_5$.

14. Glass according to claim 1 or 2, further comprising 0.5–5 weight percent P$_2$O$_5$.

15. Glass according to claim 1 or 2, wherein 0.5–3 weight percent of the oxygen ions are substituted by fluoride ions.

* * * * *